United States Patent [19]
Yamakawa et al.

[11] Patent Number: 5,482,777
[45] Date of Patent: Jan. 9, 1996

[54] MAGNETIC RECORDING MEDIA AND COMPOSITION CONTAINING A SPECIFIED POLYURETHANE BINDER

[75] Inventors: Masahiro Yamakawa, Kawasaki; Katsuya Nakamura, Tokyo, both of Japan

[73] Assignee: Nippon Zeon Co., Ltd., Tokyo, Japan

[21] Appl. No.: 76,703

[22] Filed: Jun. 15, 1993

Related U.S. Application Data

[63] Continuation of Ser. No. 634,723, Dec. 27, 1990, abandoned.

[30] Foreign Application Priority Data

Dec. 27, 1989 [JP] Japan ..................... 1-339096
Feb. 2, 1990 [JP] Japan ..................... 2-23778
Feb. 2, 1990 [JP] Japan ..................... 2-23780
Nov. 28, 1990 [JP] Japan ..................... 2-323235

[51] Int. Cl.$^6$ ........................................ G11B 5/00
[52] U.S. Cl. ............................ 428/425.9; 428/694 BU; 428/694 BY; 428/694 BL; 428/694 BB; 428/900; 252/62.54
[58] Field of Search ............................ 428/694, 900, 428/425.9, 694 BU, 694 BY, 694 BL, 694 BB; 528/65; 252/62.54

[56] References Cited

U.S. PATENT DOCUMENTS

| | | | |
|---|---|---|---|
| 4,152,485 | 5/1979 | Mizumura et al. | 428/425 |
| 4,328,935 | 5/1982 | Steel | 242/192 |
| 4,439,486 | 3/1984 | Yamada et al. | 428/332 |
| 4,937,098 | 6/1990 | Nishikawa et al. | 427/132 |
| 5,069,807 | 12/1991 | Ohkubo et al. | 252/62.54 |
| 5,071,578 | 12/1991 | Ohkubo et al. | 252/62.54 |

FOREIGN PATENT DOCUMENTS

| | | |
|---|---|---|
| 0263298 | 4/1988 | European Pat. Off. . |
| 0341375 | 11/1989 | European Pat. Off. . |

OTHER PUBLICATIONS

Yutaka Mizumura et al, Japanese Patent Publication No. 41565/Sep. 1983.
Masashi Somezawa, Japanese Laid–Open Patent Application No. 92422/Jun. 1982 with English Abstract.
Tatsuo Kamihori et al, Japanese Patent Publication No. 42486/Dec. 1973 and English translation of Claim 1.
Seiji Nishioka et al, Japanese Patent Publication No. 35525/Sep. 1977 with English translation of Claim 1.
Goro Akashi et al, Japanese Patent Publication No. 28048/Jul. 1972 and English translation of Claim 1.
Nishikawa, et al., Japanese Unexamined Patent Appln. Kokai 55–122,232, Patent Abstracts of Japan, P field, vol. 6, No. 137, Jul. 24, 1982.
Akiyama, Japanese Unexamined Patent Appln. Kokai 57–60,529, Patent Abstracts of Japan, P field, vol. 4, No. 180, Dec. 12, 1980.

*Primary Examiner*—Stevan A. Resan
*Attorney, Agent, or Firm*—Sherman and Shalloway

[57] ABSTRACT

According to this invention, there is provided a binder containing a polyurethane resin having an urethane bond and formed by the reaction of a diisocyanate and a polyol, said resin containing on the average at least 2.3 isocyanate groups in a molecule, having a number average molecular weight of at least 2,000 but at most 10,000 and containing less than 20% of a component having a molecular weight of at most 1,000; a magnetic recording layer or back coat layer using same; and a magnetic recording medium having same. Said magnetic recording medium is excellent in magnetic characteristics, durability and running property.

21 Claims, No Drawings

MAGNETIC RECORDING MEDIA AND COMPOSITION CONTAINING A SPECIFIED POLYURETHANE BINDER

This continuation of application Ser. No. 07/634,723, filed Dec. 27, 1990 now abandoned.

This invention relates to a binder, a magnetic recording layer of a magnetic tape wherein a magnetic layer containing a magnetic powder is formed on a nonmagnetic substrate or a back coat layer disposed opposite the magnetic layer formed surface of the non-magnetic substrate on which the magnetic layer is formed, and a magnetic recording medium composed of same.

In recent years, a higher recording density of a magnetic recording medium has been required, such as, for example, a magnetic tape having high saturated magnetic flux density $B_m$, a squareness ratio $R_s$ (residual magnetic flux density $B_r$/saturated magnetic flux density $B_m$), low surface roughness and excellent flexibility and excellent wear resistance. From the demand of a high S/N ratio, to uniformly disperse a fine magnetic powder having a specific surface area of 30 $m^2/g$ to 70 $m^2/g$ for strong bonding, the binder is required to have excellent dispersility and tough bonding strength.

As the binder, however, there have been so far used polyester resins, cellulosic resins, polyurethane resins, phenolic resins, epoxy resins, polyamide resins, and polymers or copolymers of vinyl chloride, vinylidene chloride, vinyl acetate, (meth)acrylates, (meth)acrylamide, acrylonitrile, butadiene, styrene and vinyl esters. However, none can provide sufficient characteristics in both dispersibility of the magnetic powder and wear resistance of the magnetic layer.

Of these binders, the polyurethane resins have been widely used because of good abrasion resistance, but suffered drawbacks that absorbability to a magnetic powder is low and dispersibility of said powder is poor.

In order to conquer these drawbacks of the above usual polyurethane resins, there is a proposal that a sulfonate group or a carboxyl group is introduced in a molecular chain (Japanese Patent Publication No. 41565/1983 and Japanese Laid-open Patent Application No. 92422/1982). However, though in the above proposal the dispersibility is improved, the good wear resistance of the polyurethane resins is impaired.

Meanwhile, to enhance strength of the binder, it is vital to increase a molecular weight of the binder. Nevertheless, if the molecular weight is increased, viscosity of the coating having dispersed therein the magnetic powder is increased, thereby decreasing dispersibility. As the magnetic powder becomes finer, viscosity of the coating tends to go higher. Accordingly, a method of improving strength without relying on the increase in molecular weight has been demanded. As one such method, crosslinking of the binder by a polyisocyanate compound has been widely utilized. To enable crosslinking by the polyisocyanate compound, a group capable of reacting with the isocyanate group, typified by a hydroxyl group, has been introduced into the binder.

However, when a large amount of the hydroxyl group is introduced into the binder, a magnetic coating blended with a lubricant typified by aliphatic acids or their esters is decreased in dispersion stability of the magnetic powder, making it impossible to stably produce a magnetic recording medium having good characteristics. Meanwhile, when the amount of the hydroxyl group is small, crosslinking is insufficient. As a result, improvement in strength cannot be achieved, and the amount of the isocyanate group of the isocyanate compound becomes larger than the hydroxyl group of the binder. The remaining isocyanate compound is reacted with moisture in air, making the magnetic layer brittle.

In order that the magnetic layer does not become brittle even if reacting the remaining isocyanate compound with moisture in air, the use of an urethane prepolymer having isocyanate groups at both ends or a humid-curable polyurethane, or the conjoint use of the urethane prepolymer having isocyanate groups at both ends, a low-molecular polyisocyanate compound and a polyol has been proposed (Japanese Patent Publication Nos. 42486/1973, 35525/1977 and 28048/1972). In this proposal, however, sufficient durability cannot be provided, posing problems with poor separation from a calender and stickiness owing to incomplete reaction.

Moreover, to meet the demand of the higher recording density of the magnetic recording medium, a method of micronizing a magnetic powder or a method of improving surface characteristics of the magnetic recording layer with a non-magnetic support having high smoothness has been employed. However, in the above methods, surface characteristics are improved in the front and back surfaces of the recording medium so that coefficient of friction is increased in both surfaces which is disadvantageous in running property and durability. For this reason, it is a practice that the back coat layer is mounted on the opposite surface to the magnetic layer surface on the support.

The back coat layer is generally composed chiefly of a non-magnetic powder and a binder. Suitable raisings and recesses are formed on the surface of the back coat layer to improve the running property of the magnetic tape. This is because when the surface of the back coat layer is too smooth, a contact area with a running system increases to increase friction coefficient and decrease running property of the magnetic tape. On the other hand, when raisings and recesses are excessively formed on the surface of the back coat layer, raisings and recesses of the back coat layer are transferred to the magnetic recording layer, impairing surface characteristics of the magnetic recording layer and decreasing electric properties of the magnetic recording medium. Accordingly, regarding the production of the back coat layer, it is necessary not only to adjust a particle size distribution of a non-magnetic powder but also to increase dispersibility of the non-magnetic powder in the back coat layer.

As the binder for back coat layer, polyurethane resins, vinyl chloride resins, polyester resins, nitrocellulose resins, epoxy resins and phenoxy resins have been hitherto used either singly or in combination.

In the back coat layer, dispersibility of the binder in the non-magnetic powder is an important factor that influences durability and running property. The aforesaid ordinary binders are poor in dispersibility and suffer problems with occurrence of flaw due to pinch rollers or guide pins and dropping of the powder after numerous runnings.

In order to improve durability and running property, there is, for example, a method in which a surface active agent is used as a dispersing agent in the back coat layer. However, as the surface active agent has a low molecular weight, it gives rise to a problem such as deterioration of mechanical strength or durability owing to dropping of a powder because of insufficient retaining force in the back coat layer and blooming with time.

An object of this invention is to solve the ordinary problems to the demands of higher recording density and higher durability of the magnetic recording medium. To achieve the object, the present inventors have made extensive studies, and consequently found that a specific polyurethane resin is used as a binder of a magnetic powder and a specific compound is contained in a magnetic recording layer to obtain a low-viscosity magnetic coating having stably dispersed therein a finely divided magnetic powder. They have further found that a magnetic recording medium obtained by coating said coating on a non-magnetic substrate can exhibit excellent magnetic characteristics, durability and running property.

The present inventors have still further found that in a magnetic recording medium in which a back coat layer containing a non-magnetic powder dispersed in a binder is mounted on an opposite surface to a surface of a magnetic recording layer on a non-metallic support, a specific polyurethane resin is contained as a binder component for back coat layer so that dispersion of the non-magnetic powder becomes quite easy and a back coat layer excellent in smoothness can be formed, as well as a back coat layer having low friction coefficient and excellent durability can be afforded.

This invention thus provides a binder containing a polyurethane resin having an urethane bond and formed by the reaction of a diisocyanate and a polyol, said resin containing on the average at least 2.3 isocyanate groups in a molecule and a number average molecular weight of at least 2,000 but at most 10,000 and containing less than 20% of a molecular weight fraction with a molecular weight of no more than 1,000, and a magnetic recording layer using same.

This invention further provides a back coat layer composed chiefly of a non-magnetic powder and a binder, and still further a magnetic recording medium having the magnetic recording layer and/or the back coat layer.

The molecular weight of the polyurethane resin used in this invention was measured by gel permeation chromatography (hereinafter abbreviated as "GPC"). The molecular weight distribution was calculated using polystyrene of a known molecular weight as a standard.

Regarding a polyurethane resin having an isocyanate group like the polyurethane resin used in this invention, the molecular weight was measured by GPC after the reaction of methanol at room temperature.

The molecular weight of the polyurethane resin used in this invention is required to be in the range of 2,000 to 10,000 in number average molecular weight. When the number average molecular weight is less than 2,000, strength is low and a good binder cannot be obtained. When it exceeds 10,000, viscosity of a coating having dispersed therein a magnetic powder is increased, lowering dispersibility.

The polyurethane resin used in this invention is required to contain less than 20% of a molecular weight fraction having a molecular weight of at most 1,000 (this value is such that the molecular weight distribution was measured by GPC and the amount of the molecular weight fraction having the molecular weight of at most 1,000 was then calculated). When the amount of the molecular weight fraction having the molecular weight of at most 1,000 is more than the above value, the resin tends to be tacky, causing decrease in running property. The reason is presumably that a tacky substance is deposited on the surface of the magnetic layer.

The number of isocyanate groups of the polyurethane resin used in this invention has to be on the average at least 2.3 per molecule. When it is less than 2.3, bonding of the polyurethane resin cannot give sufficient network structure, nor are satisfactory mechanical properties and abrasion resistance provided.

The polyurethane resin used in this invention is obtained from a mixture of an organic diisocyanate and a polyol containing at least 3 hydroxyl groups, or a mixture of them and a terminal hydroxyl group-containing linear diol.

Examples of the organic diisocyanate include 2,4-tolylene diisocyanate (hereinafter abbreviated as "2,4-TDI"), 2,6-tolylene diisocyanate (hereinafter abbreviated as "2,6-TDI"), a mixture of them, 4,4'-diphenylmethane diisocyanate (hereinafter abbreviated as "MDI"), p-phenylene diisocyanate, m-phenylene diisocyanate, 1,5-naphthylene diisocyanate, isophorone diisocyanate, hexamethylene diisocyanate, lysine diisocyanate, xylylene diisocyanate, cyclohexane diisocyanate, hydrogenated MDI, and a mixture of them. Of these, MDI, 2,4-TDI and the mixture of them are preferable.

Examples of the terminal hydroxyl group-containing linear diol are a polyether polyol, a polyester polyol and a low-molecular glycol containing a terminal hydroxyl group and having a molecular weight of 500 to 3,000. Examples of the polyether polyol are polycondensates obtained by polycondensation of one or more of glycols such as ethylene glycol, 1,2-propylene glycol, 2,3-butylene glycol, 1,4-butylene glycol, 2,2-dimethyl-1,3-propane diol, diethylene glycol, 1,5-pentamethylene glycol, 1,6-hexamethylene glycol, 3-methyl-1,5-pentane diol, cyclohexane-1,4-diol and cyclohexane-1,4-methanol with dibasic acids such as succinic acid, maleic acid, adipinic acid, glutamic acid, pimelic acid, suberic acid, azelaic acid, sebacic acid, phthalic acid, isophthalic acid, terephthalic acid, hexahydroterephthalic acid and hexahydroisophthalic acid, or acid esters and acid halides thereof. Further available are polycaprolactone diols formed by ring opening addition-polymerization of epsilon-caprolactones in the presence of the above glycols. As the low-molecular glycol, the glycols used in producing the above polyesters can be used either singly or in combination. Still further available are diols formed by adding to hydroquinones 2 to 4 mols of ethylene oxide, propylene oxide or butylene oxide.

Examples of the polyol containing at least 3 hydroxyl groups in a molecule include low-molecular triols and tetraols such as trimethylolethane, trimethylolpropane, glycerol, pentaerythritol and triethanolamine; polyether polyols obtained by adding ethylene oxide, propylene oxide or butylene oxide to the terminal hydroxyl group-containing polyether polyols having the molecular weight of 500 to 3,000; polyester polyols obtained by polycondensing mixtures of the low-molecular triols and the low-molecular glycols with the dibasic acids or the acid esters and acid halides thereof; and polycaprolactone polyols resulting from ring opening addition-polymerization of lactones such as epsilon-caprolactones in the presence of the mixtures of the triols and the glycols.

In producing the polyurethane resin used in this invention, it is advisable that the NCO/OH mol ratio of the organic diisocyanate and the polyol is 1.2/1 to 2/1. If it is deviated from the above range, the excellent properties found in this invention cannot be provided.

Examples of the polar group having no active hydrogen atom in the molecule which is preferably introduced into the polyurethane resin in this invention, are as follows;

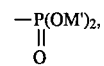

wherein M denotes an alkali metal, M' denotes an alkali metal or a hydrocarbon group, and R denotes an organic residue such as an alkyl group, an allyl group, an alkenyl group or an alkoxy group.

In this invention, the polar group having no active hydrogen atom in the molecule can be introduced into the polyurethane resin by adding a compound having in a molecule at least one active hydrogen atom capable of reacting with the isocyanate group together with the active hydrogen-free polar group to the reaction system in forming the polyurethane resin. Examples of such compound include compounds having one active hydrogen group in a molecule, such as sodium phenolsulfonate, 4-sodium sulfobenzyl alcohol, sodium isethionate, 4-sodium sulfophenylacetate, 4-sodium sulfophenylpropionate, 4-sodium sulfoaniline, 4-sodium sulfobenzamide, sodium salicylate, sodium glycolate and sodium p-aminobenzoate; and compounds having 2 active hydrogen groups in a molecule, such as sodium hydroxysulfonate, 5-sodium sulfosalicylate, 2-sodium sulfo-1,4-butanediol, 5-sodium sulfoisophthalate, sodium 2,4-dihydroxybenzoate, sodium dimethylolpropionate and sodium 4,4-bishydroxyphenylbutyrate.

It is also possible that the active hydrogen-free polar group is previously introduced into the long-chain polyols used in preparing the polyurethane resin by a known method.

The number of the active hydrogen-free polar group of the polyurethane resin in this invention is 0.2 to 5, preferably 0.5 to 3 per molecule of the polyurethane resin. When it is more than 5, humidity resistance decreases. When it is less than 0.2, the effects of this invention are not exhibited.

In producing the polyurethane resin used in this invention, an organometal compound such as dibutyltin dilaurate or a tertiary amine such as N-methylmorphorine or triethylamine may be added as a catalyst if required. Moreover, an antioxidant, a UV absorber and a hydrolysis hindering agent may be added to increase stability of the resin.

In preparing the polyurethane resin used in this invention, a known method is employable. Examples thereof are a method in which reactants are well mixed in the presence of a catalyst if required and the reaction mixture is injected into an extruder, and a solution reaction method in which the reaction is performed in an organic solvent. Examples of the organic solvent are dimethylformamide, toluene, xylene, benzene, dioxane, cyclohexane, methyl ethyl ketone, methyl isobutyl ketone, cyclohexane, ethyl acetate and butyl acetate. They may be used either singly or in combination.

The polyurethane resin in this invention can be used as a binder after blocking the isocyanate group with a known blocking agent such as phenol. By converting the isocyanate group of the polyurethane resin in this invention into a blocked isocyanate group, a stable magnetic coating having excellent storage stability is obtained and a good magnetic recording layer is provided by coating said magnetic coating, and heating and drying it.

As a binder of a magnetic powder in the magnetic recording medium of this invention, the above polyurethane resin can be ordinarily used either singly or in combination with the other binder. It is advisable that the amount of the polyurethane resin used in combination with the other binder is 10 to 90% by weight based on the total weight of the binders.

Examples of the other binder available in this invention are polyols, triazinethiols and polyamines.

The other binder component used in admixture is not particularly limited. Examples of the other binder component are thermoplastic resins such as the other polyurethane resin than that in this invention, a vinyl chloride-vinyl acetate copolymer, a copolymer of vinyl chloride, vinyl acetate, maleic acid and/or (meth)acrylic acid, a vinyl chloride-vinyl propionate copolymer, saponified products of the above vinyl chloride-vinyl carboxylate copolymers, a vinyl chloride-vinylidene chloride copolymer, a vinyl chloride-acrylonitrile copolymer, a (meth)acrylate-acrylonitrile copolymer, a (meth)acrylate-vinylidene chloride copolymer, a (meth)acrylate-styrene copolymer, a nylon-silicone resin, a nitrocellulose-polyamide resin, polyvinyl fluoride, a vinylidene chloride-acrylonitrile copolymer, a butadiene-acrylonitrile copolymer, a styrene-butadiene copolymer, a styrene-butadiene-acrylonitrile copolymer, a polyamide resin, polyvinyl butyral, cellulose derivatives (cellulose acetate butyrate, cellulose acetate propionate, cellulose diacetate, cellulose triacetate and nitrocellulose), polyester resins, a chlorovinyl ether-acrylate copolymer, and various synthetic rubbers; and thermosetting resins such as a phenolic resin, a phenoxy resin, an urea resin, a melamine resin, an alkyd resin, a silicone resin, an acrylic reaction resin, an epoxy-polyamide resin, and a nitrocellulose melamine resin.

The other polyurethane resin than that in this invention which is used in combination with the polyurethane resin in this invention is especially preferably a polyurethane resin containing at least 2 hydroxyl groups in a molecule and having a number average molecular weight of at most 50,000, providing a magnetic recording layer excellent in dispersibility and durability of the magnetic powder.

Moreover, these binders may have the other known functional groups. It is especially preferable that said binders have at least one functional group selected from —$SO_4M$, —$SO_3M$, —$SO_2M$, —COOM, —$NH_2$, —$N \oplus R_3$ (in which M denotes a hydrogen atom or an alkali metal, and R denotes an organic residue such as an alkyl group, an allyl group, an alkenyl group or an alkoxyl group), —OH, a phosphoric acid group and a phosphoric acid ester group. It is advisable that the amount of said functional group is $1 \times 10^{-6}$ to $1 \times 10^{-2}$ equivalent per gram of the resin.

The total amount of the binders in the magnetic layer of the magnetic recording medium in this invention is usually 10 to 100 parts by weight, preferably 15 to 40 parts by weight per 100 parts by weight of the ferromagnetic powder.

Examples of the polyols in the compounds used together with the polyurethane resin as the binder of this invention are low-molecular polyols containing at least 2 hydroxyl groups in a molecule, which are used to prepare the above polyurethane resin, and high-molecular polyols such as polyether polyols, polyester polyols, polycaprolactone polyols, and polycarbonate polyols.

It is advisable that the amount of the polyol in the magnetic recording medium of this invention is such that the amount of the hydroxyl group of the polyol is 0.1 to 1.0 equivalent per equivalent of the isocyanate group of the polyurethane resin. When it is less than 0.1 equivalent, the effects of this invention are not exhibited. When it is more than 1.0 equivalent, the unreacted product remains and durability decreases.

Since the polyol acts as a dispersing agent of the magnetic powder in a step of producing the magnetic coating, i.e. a step of mixing the magnetic powder with the binder and the solvent and dispersing same, a magnetic coating having excellent dispersibility can be obtained. Moreover, in a step of producing a magnetic recording medium by coating the magnetic coating on a non-metallic support to form a magnetic layer, the reaction of the polyurethane resin and the polyol in this invention advances, and abrasion resistance and durability of the magnetic recording medium improve.

As the triazinethiols among the compounds used together with the polyurethane resin as the binder of the magnetic powder in the magnetic recording medium of this invention, at least one triazinethiol selected from the group represented by formula

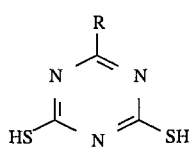

$$(1)$$

is taken as its typical example.

The triazinethiol of formula (1) includes various derivatives depending on the substituent R. Examples of R re —SH, —N(CH$_3$)$_2$, —NHC$_6$H$_5$, —N(C$_4$H$_9$)$_2$, —N(C$_8$H$_{17}$)$_2$, —N(C$_{12}$H$_{25}$)$_2$, —N(CH$_2$CH=CH$_2$)$_2$, and —NHC$_8$H$_{16}$CH=CHC$_8$H$_{17}$.

It is advisable that the amount of the triazinethiol is 0.1 to 20 parts by weight per 100 parts by weight of the magnetic powder. When it is less than 0.1 part by weight, the effects by its addition are not provided. When it is more than 20 parts by weight, dispersiblity of the magnetic powder rather decreases and the unreacted product remains, decreasing durability.

In the triazinethiol compound of this invention, the thiol group acts as a dispersing agent in the dispersing step to produce the magnetic coating, making it possible to obtain a magnetic coating having excellent dispersibility. After coating the magnetic coating and forming the surface, the reaction between the isocyanate group and the thiol group of the polyurethane resin in this invention proceeds, improving abrasion resistance and durability of the magnetic recording medium.

What is more, the polyurethane resin containing the isocyanate group in this invention is combined with the triazinethiol compound and further with the resin containing the epoxy group reactive with the thiol group to provide crosslinkage between the polyurethane resin and the epoxy group-containing resin by the triazinethiol compound, markedly improving abrasion resistance and durability.

The polyamine compounds among the preferable compounds used together with the polyurethane resin as the binder of the magnetic powder in the magnetic recording medium of this invention are compounds containing 2 or more amino groups in a molecule. Examples thereof are diamines such as ethylenediamine, tetramethylenediamine, pentamethylenediamine, hexamethylenediamine, o-phenylenediamine, p-phenylenediamine and 4-aminodiphenylamine, triamines such as 1,2,3-triaminopropane, tris(2-aminoethyl)methane, tetra(aminomethyl)methane, diethylenetriamine and triaminobenzene, and polyamines such as triethylenetetramine and tetraethylenepentamine.

In the magnetic recording medium of this invention, it is advisable that the amount of the amino group of the polyamine compound is 0.1 to 1.0 equivalent per equivalent of the isocyanate group of the polyurethane resin. When the amount is less than 1.0 equivalent, the effects of this invention are not exhibited. When it is more than 1.0 equivalent, the unreacted product remains and durability also decreases. It is advisable that the polyurethane resin is added during or after the step of preparing the magnetic coating. When it is added in the initial stage, the magnetic coating becomes sticky and pot life tends to shorten.

Examples of the epoxy group-containing resin used preferably in this invention are an epoxy group-containing vinyl chloride resin, an epoxy group-containing chlorinated polyvinyl chloride resin, an epoxy-modified polyurethane resin, an epoxy-modified polyester resin, an epoxy-modified acrylonitrile-butadiene copolymer resin and an epoxy resin.

The epoxy group-containing vinyl chloride resin can be formed by (1) a method in which vinyl chloride, a radical-polymerizable monomer having an epoxy group copolymerizable with vinyl chloride and optionally a monomer copolymerizable with these monomers are polymerized in the presence of a radical initiator or (2) a method in which a resin obtained by partially dehydrochlorinating polyvinyl chloride or a copolymer resin composed mainly of vinyl chloride with heating or by contact with a dehydrochlorinating agent is epoxidized with an epoxidizing agent with a percarboxylic acid. The epoxy group-containing chlorinated polyvinyl chloride resin can be formed by the method (2) using a chlorinated polyvinyl chloride resin or a chlorinated polyvinyl chloride copolymer resin as a starting material.

Examples of the epoxy group-containing monomer used to produce the epoxy group-containing vinyl chloride resin include glycidyl ethers of unsaturated alcohols such as allylglycidyl ether and methallylglycidyl ether; glycidyl esters of unsaturated acids such as glycidyl acrylate, glycidyl methacrylate, glycidyl-p-vinyl benzoate, methylglycidyl itaconate, glycidylethyl maleate, glycidylvinyl sulfonate and glycidyl(meth)allyl sulfonate; and epoxide olefins such as butadiene monoxide, vinylcyclohexene monoxide and 2-methyl-5,6-epoxyhexene.

Examples of the epoxy group-containing monomer and the monomer other than vinyl chloride which is optionally used include vinyl carboxylates such as vinyl acetate and vinyl propionate; vinyl ethers such as methyl vinyl ether, isobutyl vinyl ether, and cetyl vinyl ether; vinylidenes such as vinylidene chloride and vinylidene fluoride; unsaturated carboxylic acid esters such as diethyl maleate, butylbenzyl maleate, di-2-hydroxyethyl maleate, dimethyl itaconate, methyl (meth)acrylate, ethyl (meth)acrylate, lauryl (meth)acrylate and 2-hydroxypropyl (meth)acrylate; olefins such as ethylene and propylene; unsaturated nitriles such as (meth)acrylonitrile; and aromatic vinyls such as styrene, alpha-methylstyrene and p-methylstyrene. These monomers are properly selected for the purpose of improving solubility of the resins while adjusting compatibility of the resin of this invention and the other resin when mixed with each other and their melting points, as well as according to the need of improving the characteristics of the coated film and the coating step.

The epoxy-modified polyurethane resin used in this invention has a molecular weight of 1,000 to 200,000. When the molecular weight is less than 1,000, durability of the coated film is not enough. When it exceeds 200,000, viscosity of the coating goes too high, causing troubles in practice. The epoxy-modified polyurethane resin can be synthesized by reacting an epoxy resin containing at least 2 hydroxyl groups per molecule with a dibasic acid to form a terminal hydroxyl group-containing polyester resin and further reacting the reaction mixture with a polyfunctional polyisocyanate. Examples of the epoxy resin are bisphenol A-type, halogenated bisphenol-type, resorcinol-type and bisphenol F-type epoxy resins. Examples of the dibasic acid are adipinic acid, phthalic acid, dimerized linolenic acid and maleic acid. Or it can be also synthesized by reacting a polyurethane resin formed by using as a starting material an unsaturated polyester resin resulting from the reaction of an unsaturated aliphatic acid such as maleic acid, fumaric acid or itaconic acid and a polyhydric alcohol, with an epoxidizing agent such as a percarboxylic acid.

The epoxy-modified polyester resin used in this invention has a molecular weight of 1,000 to 200,000. When the molecular weight is less than 1,000, durability of the coated film is not enough. When it exceeds 200,000, viscosity of the coated film goes too high, causing troubles in practice. The epoxy-modified polyester resin can be obtained by epoxidizing with an epoxidizing agent such as a percarboxylic acid an unsaturated polyester resin obtained by heat-polycondensing an unsaturated dibasic acid such as maleic acid, fumaric acid or itaconic acid or a saturated dibasic acid such as phthalic acid, adipic acid or terephthalic acid with a polyol such as 1,4-butanediol, 1,5-pentanediol, 1,6-hexanediol, 1,10-decanediol or a butadiene oligomer having hydroxyl groups at both ends. Instead of the unsaturated polyester resin, a modified unsaturated polyester resin obtained by melt-mixing the unsaturated polyester resin with a polycarbonate resin or a saturated polyester resin in the presence of a catalyst and conducting an ester exchange reaction may be used as a starting material.

The epoxy-modified acrylonitrile-butadiene copolymer resin used in this invention is generally such that the content of acrylonitrile is 12 to 50% by weight and the molecular weight is 5,000 to 500,000. When the content of acrylonitrile is less than 12%, compatibility with the other binders ordinarily used in the magnetic recording medium, such as polyvinyl chloride and nitrocellulose, is poor. When it is more than 50% by weight, solubility in solvent decreases, notably reducing dispersibility of the magnetic powder. When the molecular weight is less than 5,000, durability of the coated film is low. When it is higher than 500,000, viscosity of the coating is too high and it is not practical. The epoxy-modified acrylonitrile-butadiene copolymer resin is obtained by copolymerizing acrylonitrile, butadiene, an epoxy group-containing radical-copolymerizable monomer and optionally the other copolymerizable monomer in the presence of a radical initiator or by partially epoxidizing a double bond of the acrylonitrile-butadiene copolymer resin with an epoxidizing agent such as a percarboxylic acid.

The epoxy resin preferably used in this invention has a molecular weight of 500 to 200,000. When the molecular weight is less than 500, durability of the coated film is low and the unreacted product is at times bled on the surface of the magnetic layer. When it exceeds 200,000, viscosity of the coating is too high and it is not practical. Examples of the epoxy resin are a bisphenol A-epichlorihydrin resin; a resin using halogenated bisphenol, resorcinol, bisphenol F or tetrahydroxyphenolethane; and a novolak-type epoxy resin.

The epoxy group-containing resin in this invention may be an epoxy group-containing resin having a functional group such as COOM, $SO_3M$, $SO_4M$, $PO_3M_3$ or $PO_4M_3$ (in which M denotes hydrogen, an alkali metal or ammonium) to improve dispersibility of the powder.

In the binder of the magnetic recording medium of this invention, it is advisable that based on the total weight of the binder components, the amount of the epoxy group-containing resin is about 20 to about 80% by weight and the amount of the polyurethane resin is about 80 to about 20% by weight.

The magnetic recording layer of this invention is obtained by mixing the binder with known materials such as a magnetic powder, a lubricant, an abrasive, an antistatic agent and if required, a solvent composed mainly of ketones, conducting a dispersing treatment to obtain a magnetic coating, and coating the magnetic coating on a non-magnetic film typified by a polyester film, followed by orientation, surface formation and if required, heat treatment for crosslinking, surface grinding, cutting and incorporation.

It is not particularly limited when the polyurethane resin of this invention is added in the dispersion treatment using said polyurethane resin. It is however especially preferable in the aspect of stability of the magnetic coating that after the dispersion treatment with the resins other than the polyurethane resin of this invention and the additives, the polyurethane resin of this invention is added and the dispersion treatment is further conducted.

As the ferromagnetic powder used in this invention, a fine powder is especially preferable. Examples thereof are ferromagnetic iron oxide powders such as $\gamma\text{-}Fe_2O_3$, $Fe_3O_4$ and $\gamma\text{-}FeO_x$ (1.33<x<1.5), Co-doped ferromagnetic iron oxide powders, ferromagnetic chromium dioxide powders, ferromagnetic metallic powders, barium ferrite, iron carbide powders such as $Fe_5C_2$ and iron nitride powders.

The ferromagnetic metallic powders are ferromagnetic metallic powders containing iron, cobalt or nickel. Examples thereof are ferromagnetic metallic powders in which the metal content of the powders is at least 75% by weight, at least 80% by weight of the metallic content is at least one ferromagnetic metal or alloy (e.g. Al, Fe, Co, Ni, Fe—Co, Fe—Ni, Co—Ni and Co—Ni—Fe), and at most 20% by weight of the metallic content is an alloy that may contain the other component (e.g. Al, Si, S, Sc, Ti, V, Cr, Mn, Cu, Zn, Y, Mo, Rh, Pd, Ag, Sn, Sb, Te, Ba, Ta, W, Re, Au, Hg, Pb, Bi, La, Ce, Pr, Nd, B and P).

A method of producing these ferromagnetic powders is already known, and the ferromagnetic powders used in this invention can be produced by the known method.

The form of the ferromagnetic powders is not limited in particular. The powders can usually take the form of needles, granules, dies, grains or sheet.

Examples of the lubricant available in this invention are aliphatic acids having 8 to 19 carbon atoms, higher alcohols, amides and aliphatic acid esters. Concrete examples thereof are caprylic acid, capric acid, lauric acid, myristic acid, palmitic acid, stearic acid, oleic acid, elaidic acid, linoleic acid, linolenic acid, stearolic acid, stearyl alcohol, palmityl alcohol, laurylamide, dimethylstearylamide, butyllaurylamide, butyl stearate, octyl stearate and sorbitan oleate. Moreover, silicone oils, fluorine oils such as polyperfluoroalkylene oxides and perfluoroalkanes, paraffin waxes and polyethylene oxide are also available. Further, solid lubricants such as carbon black, graphite, molybdenum disulfide and tungsten disulfide are available. The amount of the lubricant is 1 to 6 parts per 100 parts of the magnetic powder.

Examples of the abrasive include $TiO_2$, TiO, ZnO, CaO, $SnO_2$, $SiO_2$, $\alpha\text{-}Fe_2O_3$, $Cr_2O_3$, $\alpha\text{-}Al_2O_3$, ZnS, $MoS_2$, $BaSO_4$, $CaSO_4$, $MgCo_3$, BN and SiC. These inorganic fillers may be used either singly or in combination.

Examples of the antistatic agent include electroconductive fine powders such as carbon black and a carbon black graft polymer; natural surface active agents such as saponin; alkylene oxide-type, glycerol-type and glycidol-type nonionic surface active agents; cationic surface active agents such as higher alkylamines, quaternary ammonium salts, salts of pyridine and other heterocyclic compounds, phosphonium compounds and sulfonium compounds; anionic surface active agents containing acid groups such as carboxylic acid, sulfonic acid, phosphoric acid, sulfate and phosphate groups; and amphoteric surface active agents such as amino acids, aminosulfonic acids and sulfates or phosphates of amino alcohols.

As the dispersing agent in this invention, known dispersing agents are available. Examples thereof are aliphatic acids having 10 to 22 carbon atoms, such as caprylic acid, capric acid, lauric acid, myristic acid, palmitic acid, stearic acid, oleic acid, elaidic acid, linoleic acid, linolenic acid and stearolic acid; metallic soaps composed of the aforesaid aliphatic acids and alkali metals such as lithium, sodium and potassium or alkaline earth metals such as magnesium, calcium and barium; esters of said aliphatic acids; compounds obtained by replacing part or the whole of hydrogens in said esters with fluorine atoms; amides of said aliphatic acids; aliphatic amines; higher alcohols; polyalkylene oxide alkylphosphates; alkyl phosphates; alkyl borates; salcosinates; alkyl ether esters; trialkyl polyolefin hydroxy quaternary ammonium salts; and lecithins.

The total amount of the binders in the back coat layer of the magnetic recording medium in this invention is usually 10 to 100 parts by weight, preferably 40 to 80 parts by weight per 100 parts by weight of the non-magnetic powder.

In the magnetic recording medium of this invention, the non-magnetic powder is incorporated into the back coat layer. As the non-magnetic powder, either the powder of the inorganic compound or the powder of the organic compound is available. Concrete examples thereof are powders of substances such as carbon black, hematite, mica, silica gel, magnesium oxide, zinc sulfide, tungsten carbide, boron nitride, starch, zinc oxide, kaolin, talc, clay, lead sulfate, barium carbonate, calcium carbonate, magnesium carbonate, boehmite, alumina, tungsten sulfide, titanium oxide, poly(tetrafluoroethylene), polyethylene, polyvinyl chloride and metals. They may be used either singly or in combination.

In the magnetic recording medium of this invention, other than the above-described components, a dispersing agent, a lubricant, an abrasive, an antistatic agent and a rust-proofing agent are properly mixed as additives and dispersed in an organic solvent to form a coating of a back coat layer which is then coated on one side of the non-magnetic support. Said additives may be ordinary additives.

As the material of the non-metallic support, any material is available if ordinarily used in this type of magnetic recording medium. Examples of said material include polyesters such as polyethylene terephthalate; polyolefins such as polyethylene and polypropylene; cellulose derivatives such as cellulose triacetate, cellulose diacetate and cellulose acetate butyrate; vinyl resins such as polyvinyl chloride and polyvinylidene chloride; plastics such as polycarbonates, polyimides, polyamides and polyamideimides; paper; metals such as aluminum and copper; light alloys such as an aluminum alloy and a titanium alloy; ceramics; and single crystal silicone. The non-magnetic support may take the form of a film, a tape, a sheet, a disc, a card or a drum.

Examples of the organic solvent to form the coating of the back coat layer include ketones such as acetone, methyl ethyl ketone, methyl isobutyl ketone and cyclohexanone; esters such as methyl acetate, ethyl acetate, butyl acetate, ethyl lactate and glycol acetate monoethyl ether; glycol ethers such as glycol dimethyl ether, glycol monoethyl ether and dioxane; aromatic hydrocarbons such as benzene, toluene and xylene; aliphatic hydrocarbons such as hexane and heptane; and organic chlorine compounds such as methylene chloride, ethylene chloride, carbon tetrachloride, chloroform, ethylenechlorohydrin and dichlorobenzene.

As the magnetic recording medium to which this invention is applied, a so-called coating-type magnetic recording medium is taken in which the magnetic coating is first coated on the surface of the non-magnetic support to form the magnetic coated film as a magnetic layer.

In the coating-type magnetic recording medium, the non-magnetic support, and the magnetic powder and the resin binder constituting the magnetic coated film are not limited in particular and any ordinary ones are available. The magnetic coated film may contain, other than the magnetic powder and the resin binder, a dispersing agent, an abrasive, an antistatic agent and a rustproofing agent as additives.

This invention can also be applied to a metal thin film-type magnetic recording medium in which a metal magnetic thin film is formed as a magnetic layer by a method such as deposition, sputtering, ion plating or plating.

On this occasion, the non-magnetic support and the metal magnetic thin film of the metal thin film-type magnetic recording medium are not limited in particular and any known ones are available. An under coat layer may be interposed between the non-magnetic support and the magnetic layer.

Thus, according to this invention, the low-viscosity coating is obtained in which the finely divided magnetic powder is dispersed stably, and the magnetic recording medium obtained by using said coating is good in surface smoothness and durability of the coated film and excellent in running property and magnetic characteristics.

Further, according to this invention, the non-magnetic powder is well dispersed to obtain a back coat layer having not only excellent smoothness but also low friction coefficient and excellent durability.

The following Synthesis Examples, Examples and Comparative Examples illustrate this invention more specifically. Parts and percents in said Examples are by weight unless otherwise indicated.

Polyurethane Synthesis Example 1

A temperature-adjustable 5-liter reaction vessel fitted with a stirring propeller, a thermometer and a condenser was charged with 566.2 g of methyl ethyl ketone, 1,000 g (1.00 mol) of polybutylene adipate having a molecular weight of 1,000, 208.8 g (1.20 g) of 2,4-TDI and 225.0 g (0.90 mol) of MDI. After the reaction was run at 80° C. for 3 hours, 500 g (0.11 mol as trimethylolpropane) of a 3% methyl ethyl ketone solution of trimethylolpropane was added, and the reaction was further conducted for 6 hours to obtain a sample (B). In the same way as above, samples (A), (C), (D) and (E) were obtained in which the amounts of the methyl ethyl ketone solution of trimethylolpropane were 0, 1,000, 1,500 and 1,800 respectively.

The compositions of the polyurethane samples are shown in Table 1.

Polyurethane Synthesis Example 2

In the same way as in Polyurethane Synthesis Example 1, samples (F), (G), (J), (K), (L) and (M) were formed except that the long-chain polyol, the diisocyanate compound and the short-chain polyol were changed as shown in Table 2 and as to the sample (K), after formation, treatment with ClCH$_2$COONa was conducted to replace the half amount of the OH group with —OCH$_2$COONa.

Moreover, in the same way as in Polyurethane Synthesis Example 1, polybutylene adipate was reacted with MDI and TDI. A melt mixture of a polar group-containing compound shown in Table 2 and trimethylolpropane was added, and the reaction was performed to obtain samples (H) and (I). The compositions of the polyurethane samples are shown in Table 2 with those of commercial urethane prepolymer (N) and humid-curable polyurethane (O).

TABLE 1

| | Polyurethane samples | | | | |
|---|---|---|---|---|---|
| | A | B | C | D | E |
| NCO/OH ratio | 2.10 | 1.80 | 1.57 | 1.40 | 1.31 |
| Number average molecular weight | 1300 | 1660 | 2240 | 3450 | 5040 |

TABLE 1-continued

| | Polyurethane samples | | | | |
|---|---|---|---|---|---|
| | A | B | C | D | E |
| Amount of a component having a molecular weight of at most 1,000 (%) | 13.9 | 5.6 | 4.2 | 3.8 | 2.0 |
| NCO concentration (%) | 4.62 | 3.13 | 2.14 | 1.43 | 1.10 |
| Solids content (%) | 71.7 | 58.0 | 48.8 | 42.3 | 39.2 |
| Number of NCO per molecule | 2 | 2.13 | 2.34 | 2.78 | 3.37 |

TABLE 2

| | Polyurethane samples | | | | |
|---|---|---|---|---|---|
| | F | G | H | I | J |
| Linear polyol | PCL | PBA | PBA | PBA | PBA |
| Molecular weight | 2000 | 1000 | 1000 | 1000 | 1000 |
| Number of OH | 3 | 2 | 2 | 2 | 2 |
| Mol number | 0.5 | 1 | 1 | 1 | 1 |
| Diisocyanate *1) | MDI 2,4-MDI | MDI | MDI 2,4-MDI | MDI 2,4-MDI | MDI |
| Mol number | 0.50  1.05 | 2.10 | 0.80  1.25 | 0.80  1.25 | 1.62 |
| Short-chain polyol | 1,4-BG | 1,4-BG TEA | TMP | TMP | 1,4-BG TMP |
| Molecular weight | 90 | 90  149 | 134 | 134 | 90  134 |
| Number of OH | 2 | 2  3 | 3 | 3 | 2  3 |
| Mol number | 0.22 | 0.22  0.22 | 0.33 | 0.24 | 0.40  0.30 |
| Polar group-containing compound | — | — | Sodium glycolate | 5-Sodium sulfosalicylate | — |
| Polar group | | | —COONa | —SO$_3$Na | |
| Mol number | | | 0.13 | 0.25 | |
| NCO/OH ratio | 1.60 | 1.35 | 1.31 | 1.37 | 0.88 |
| Number average molecular weight | 4000 | 3600 | 3760 | 5070 | 34000 |
| Amount of a component with a molecular weight of at most 1000 (%) | 2.7 | 3.9 | 3.5 | 1.8 | 1.5 |
| NCO concentration (%) | 2.00 | 1.23 | 1.18 | 0.82 | 0 |
| Solids content (%) | 54.3 | 42.0 | 42.1 | 35.0 | 33.5 |
| Number of NCO per molecule | 3.51 | 2.50 | 2.51 | 2.83 | 0 (terminal OH) |

| | K | L | M | N *2) | O *3) |
|---|---|---|---|---|---|
| Linear polyol | P-1 | P-2 | P-3/P-4 | | |
| Molecular weight | 1000 | 2000 | 3000/4000 | | |
| Number of OH | 3 | 2 | 2/2 | | |
| Mol number | 1 | 1 | 0.5/0.5 | | |
| Diisocyanate *1) | TDI | TDI | HMDI | | |
| Mol number | 0.9 | 1.27 | 0.95 | | |
| Short-chain polyol | — | THMP | — | | |
| Molecular weight | | 134 | | | |
| Number of OH | | 3 | | | |
| Mol number | | 0.3 | | | |
| Polar group-containing compound | post-modified | contained in P-2 | contained in P-4 | | |
| Polar group | —COONa | —SO$_4$Na | —SO$_4$Na | | |
| Mol number | 3.3 | 2.8 | 2.3 | | |
| NCO/OH ratio | 0.60 | 0.98 | 0.95 | | |
| Number average molecular weight | 6000 | 18000 | 35000 | 1360 | 1290 |
| Amount of a component with a molecular weight of at most 1000 (%) | 1.2 | 4.2 | 3.5 | 13.3 | 21.2 |
| NCO concentration (%) | 0 | 0 | 0 | 6.2 | 6 |
| Solids content (%) | 25.0 | 20.0 | 20.0 | 100 | 50 |
| Number of NCO per molecule | 0 (terminal OH) | 0 (terminal OH) | 0 (terminal OH) | 2.00 | 3.69 |

*1) PBA: polybutylene adipate
PCL: polycaprolactone polyol
TMP: trimethylolpropane
1,4-BG: 1,4-hydroxybutane
TEA: triethanolamine
P-1: YT-101 (a tradename for a product of Asahi Denka Kogyo K.K.)
P-2: polybutylene (adipic acid/5-sodium sulfoisophthalic acid)ester
P-3: polyethylene (isophthalic acid/sebacic acid)ester
P-4: poly(buthylene/ethylene/bisphenol A)/(adipic acid/5-sodium sulfoisophthalic acid)ester
THMP: 1,3,5-hydroxy-3-methylpentane
HMDI: hexamethylene diisocyanate

TABLE 2-continued

Polyurethane samples

*2) N: Coronate 4095 (a tradename for a product of Nippon Polyurethane Industry Co., Ltd.)
*3) O: Coronate 2014 (a tradename for a product of Nippon Polyurethane Industry Co., Ltd.)

EXAMPLES 1–11 and Comparative Examples 1–10

A mixture comprising 400 parts of a cobalt-coated magnetic iron oxide powder (specific surface area 40 $m^2/g$), 50 parts of a resin other than a polyurethane resin (50 parts of the polyurethane resin in Example 10 and 105 parts of the polyurethane resin I in Example 11), 49 parts of methyl ethyl ketone, 49 parts of toluene, 32 parts of cyclohexanone, 2 parts of carbon black, 4 parts of alumina, 2 parts of myristic acid and 1 part of butyl stearate was sheared and dispersed at high speed for 90 minutes. The polyurethane resin in the amount shown in Table 3 (55 parts of the polyurethane resin I in Example 10 and no polyurethane resin in Example 11), 30 parts of methyl ethyl ketone, 30 parts of toluene and 20 parts of cyclohexanone were added and dispersed for 30 minutes. Further, 50 parts of the above solvent mixture and 15 parts of polyisocyanate (Coronate L: a tradename for a product of Nippon Polyurethane Industry Co., Ltd.) in Comparative Examples 3 and 6 to 10 were added, and the mixture was then dispersed for another 10 minutes to obtain a magnetic coating. The resulting magnetic coating was coated on a polyester film to a thickness of a coated film of 5 micrometers and the coated film was subjected to magnetic field orientation treatment, and then dried.

The properties of the polyurethane resin and the properties of the coated film were measured and the results are shown in Table 3.

EXAMPLES 12 to 18 and Comparative Examples 11 to 14

A mixture comprising 400 parts of a cobalt-coated magnetic iron oxide powder (specific surface area 40 $m^2/g$), a resin other than a polyurethan resin in an amount shown in Table 4, a polyol in an amount shown in Table 4, 49 parts of methyl ethyl ketone, 49 parts of toluene, 32 parts of cyclohexanone, 2 parts of carbon black, 4 parts of alumina, 2 parts of myristic acid and 1 part of butyl stearate were sheared and dispersed at high speed for 90 minutes. A polyurethane resin in an amount shown in Table 4, 30 parts of methyl ethyl ketone, 30 parts of toluene and 20 parts of cyclohexanone were added and dispersed for 30 minutes. Further, 50 parts of the above solvent mixture and 15 parts of polyisocyanate (Coronate L: a tradename for a product of Nippon Polyurethane Industry Co., Ltd.) in Comparative Example 12 were added. The mixture was then dispersed for another 10 minutes to obtain a magnetic coating. The resulting magnetic coating was coated on a polyester film to a thickness of a coated film of 5 micrometers, and the coated film was subjected to magnetic field stretching treatment, and then dried.

The properties of the polyurethane resin and the properties of the coated film were measured, and the results are shown in Table 4.

EXAMPLES 19 to 25 and Comparative Examples 15 to 18

A mixture comprising 400 parts of a cobalt-coated magnetic iron oxide powder (specific surface area 40 $m^2/g$), 50 parts of a resin (shown in Table 5) other than the polyurethane resin in this invention, 5 parts of a triazinethiol compound shown in Table 5, 49 parts of methyl ethyl ketone, 49 parts of toluene, 32 parts of cyclohexanone, 2 parts of carbon black, 4 parts of alumina, 2 parts of myristic acid and 1 part of butyl stearate was sheared and dispersed at high speed for 90 minutes. The polyurethane resin in an amount shown in Table 5, 30 parts of methyl ethyl ketone, 30 parts of toluene and 20 parts of cyclohexanone were added and dispersed for 30 minutes. Further, 50 parts of the solvent mixture and 15 parts of polyisocyanate (Coronate L: a tradename for a product of Nippon Polyurethane Industry Co., Ltd.) in Comparative Example 16 were added, and the mixture was dispersed for another 10 minutes to afford a magnetic coating. The resulting magnetic coating was coated on a polyester film to a thickness of a coated film of 5 micrometers, and the coated film was subjected to magnetic field stretching treatment and then dried.

The properties of the polyurethane resin and the properties of the coated film were measured, and the results are shown in Table 5.

EXAMPLES 26 to 32 and Comparative Examples 19 to 22

A mixture comprising 400 parts of a cobalt-coated magnetic iron oxide powder (specific surface area 40 $m^2/g$), a resin other than a polyurethane resin in an amount shown in Table 6, 49 parts of methyl ethyl ketone, 49 parts of toluene, 32 parts of cyclohexanone, 2 parts of carbon black, 4 parts of alumina, 2 parts of myristic acid and 1 part of butyl stearate was sheared and dispersed at high speed for 90 minutes. The polyurethane resin in an amount shown in Table 6, 30 parts of methyl ethyl ketone, 30 parts of toluene and 20 parts of cyclohexanone were added and dispersed for 30 minutes. Further, 50 parts of the above solvent mixture was added. Finally, a polyamine compound shown in Table 6 was added in such amount that the amount of the amino group was 0.3 equivalent per equivalent of the isocyanate group of the polyurethane resin, provided in Comparative Example 20, 15 parts of polyisocyanate (Coronate L: a tradename for a product of Nippon Polyurethane Industry Co., Ltd.) was added instead of the polyamine compound. The mixture was further dispersed for 10 minutes to obtain a magnetic coating. The resulting magnetic coating was coated on a polyester film to a thickness of a coated film of 5 micrometers, and the coated film was subjected to magnetic field stretching treatment, and then dried.

The properties of the polyurethane resin and the properties of the coated film were measured, and the results are shown in Table 6.

Methods of measuring the properties of the polyurethane resin and the properties of the coated film are as follows.

1. Pot life:

One hundred parts in total of the polyurethane resin and the other resin was dissolved in 400 parts of methyl ethyl ketone at room temperature for 1 hour with stirring. The resulting solution was stored at 23° C. The number of days that lapsed until the solution did not flow even when inverting the container was measured and made a pot life.

2. Reactivity:

The solution used in the test for pot life was cast in glass sheet form. The resulting sheet was treated at 60° C. for 24 hours. Exactly 0.5 g of this sheet was taken and mixed with 50 g of tetrahydrofuran for 24 hours. Subsequently, the insoluble content was filtered, washed, dried and weighed.

Gel fraction=weight of the insoluble component/weight of the sample (%)

It means that the higher the value of the gel fraction, the higher the crosslinking reactivity of both the binders, i.e., the vinyl chloride polymer and the polyurethane resin.

3. Gloss:

Reflectance at an angle of reflection of 60° was measured for the magnetic coated film using a gloss meter.

4. Dispersion stability:

The coating used to measure gloss was left to stand for 1 hour, and then coated on a polyester film to a thickness of a coated film of 5 micrometers. The coated film was subjected to magnetic field stretching treatment and then dried. On the thus obtained magnetic coated film, reflectance at an angle of reflection of 60° was measured by a gloss meter.

5. Squareness ratio:

The magnetic coated film used to measure gloss was cut out to 6 mm×6 mm, and the squareness ratio was measured by a machine of measuring magnetic characteristics.

6. Durability of a coated film:

The magnetic coated film used to measure gloss was smoothed by a calender roll, and heat-treated at 65° C. for 65 hours in Examples 1–11 and 19–25 and Comparative Examples 1–10 and 15–18, and for 25 hours in Examples 12–18 and 26–32 and Comparative Examples 11–14 and 19–22. The heat-treated film was contacted with a rotary drum having an abrasive paper under a load of 100 g, and rotated at 150 rpm for 10 minutes. A degree in which the magnetic coating adhered to the abrasive paper was observed with an unaided eye and evaluated according to the following four grades A, B, C and D.

A: not contaminated

B: very slightly contaminated

C: slightly contaminated

D: heavily contaminated

7. Running property:

In the same way as in measuring durability, a force generated between the coated film and the rotary drum was measured at 65° C. and a relative humidity of 80% by a U-gauge. The running property was evaluated by the following three grades in the order of less running resistance.

A: low

B: medium

C: high

TABLE 3

|  | Example |  |  |  |  |  |  | Comparative Example |  |  |  |  |
|---|---|---|---|---|---|---|---|---|---|---|---|---|
|  | 1 | 2 | 3 | 4 | 5 | 6 | 7 | 1 | 2 | 3 | 4 | 5 |
| Resin composition (parts) | | | | | | | | | | | | |
| Polyurethane resin *1) | C | D | E | F | G | H | I | A | B | J | N | O |
|  | 55 | 55 | 55 | 55 | 55 | 55 | 55 | 55 | 55 | 40 | 55 | 55 |
| Resin other than the | (a) | (a) | (a) | (a) | (a) | (a) | (a) | (a) | (a) | (a) | (a) | (a) |
| polyurethane resin | 50 | 50 | 50 | 50 | 50 | 50 | 50 | 50 | 50 | 50 | 50 | 50 |
| Coronate L | — | — | — | — | — | — | — | — | — | 15 | — | — |
| Pot life (days) | 10 | 10 | 10 | 10 | 10 | 10 | 10 | 10 | 10 | 10 | 10 | 2 |
| Reactivity (%) | 93 | 93 | 93 | 93 | 93 | 93 | 93 | 87 | 90 | 89 | 70 | 93 |
| Gloss (%) | 110 | 110 | 110 | 110 | 110 | 125 | 130 | 110 | 110 | 80 | 100 | 85 |
| Dispersion stability (%) | 98 | 98 | 98 | 98 | 98 | 98 | 110 | 98 | 98 | 54 | 86 | 65 |
| Viscosity of a coating (cps) | 1500 | 1500 | 1500 | 1500 | 1500 | 1300 | 1300 | 1500 | 1500 | 2700 | 1500 | 9700 |
| Squareness ratio | 0.87 | 0.87 | 0.87 | 0.87 | 0.87 | 0.91 | 0.93 | 0.87 | 0.87 | 0.78 | 0.83 | 0.73 |
| Durability of a coated film | A | A | A | A | A | A | A | D | D | D | D | D |
| Running property | A | A | A | A | A | A | A | C | C | C | C | C |

|  | Example |  |  |  | Comparative Example |  |  |  |  |
|---|---|---|---|---|---|---|---|---|---|
|  | 8 | 9 | 10 | 11 | 6 | 7 | 8 | 9 | 10 |
| Resin composition (parts) | | | | | | | | | |
| Polyurethane resin *1) | D | D | I/M | I | J | K | L | M | J |
|  | 55 | 55 | 55/55 | 105 | 40 | 40 | 40 | 40 | 40 |
| Resin other than the | (b) | (c) | — | — | (b) | (b) | (b) | (b) | (c) |
| polyurethane resin | 50 | 50 | — | — | 50 | 50 | 50 | 50 | 50 |
| Coronate L | — | — | — | — | 15 | 15 | 15 | 15 | 15 |
| Pot life (days) | 10 | >20 | 10 | >20 | 10 | 10 | 10 | 10 | >20 |
| Reactivity (%) | 90 | 70 | 80 | 87 | 70 | 60 | 60 | 65 | 47 |
| Gloss (%) | 100 | 87 | 120 | 110 | 80 | 85 | 90 | 90 | 55 |
| Dispersion stability (%) | 89 | 78 | 95 | 98 | 58 | 58 | 60 | 65 | 26 |
| Viscosity of a coating (cps) | 2200 | 3600 | 1700 | 1200 | 3200 | 2700 | 3000 | 3500 | 5200 |
| Squareness ratio | 0.83 | 0.85 | 0.86 | 0.90 | 0.78 | 0.82 | 0.82 | 0.80 | 0.70 |
| Durability of a coated film | A | A | A | A | D | D | D | D | D |
| Running property | A | A | A | A | C | C | C | C | C |

*1): The amount of the polyurethane resin is as a solids content.
(a): Vinyl chloride copolymer containing an epoxy group and $SO_4K$(MR-110: a tradename for a product of Nippon Zeon Co., Ltd.)
(b): Vinyl chloride-vinyl acetate-maleic acid-vinyl alcohol copolymer (average polymerization degree: 400, COOH: 0.8 wt. %, OH: 0.1 wt. %)
(c): Nitrocellulose (CELLINE R1/2: a tradename for a product of Daisel Kagaku Kogyo K.K.)

TABLE 4

|  | Example |  |  |  |  |  |  | Comparative Example |  |  |  |
| --- | --- | --- | --- | --- | --- | --- | --- | --- | --- | --- | --- |
|  | 12 | 13 | 14 | 15 | 16 | 17 | 18 | 11 | 12 | 13 | 14 |
| Resin composition (parts) | | | | | | | | | | | |
| Polyurethane resin | C | D | E | F | G | H | I | B | J | K | L |
| Amount (parts) | 55 | 55 | 60 | 55 | 55 | 60 | 60 | 55 | 55 | 55 | 55 |
| Resin other than the polyurethane resin *1) | (a) | (a) | (a) | (b) | (b) | (a) | (b) | (a) | (a) | (b) | (a) |
| Amount (parts) | 50 | 50 | 40 | 40 | 40 | 40 | 40 | 50 | 50 | 50 | 40 |
| Polyol *2 | 1,6HG | TMP | PBA | PCL | PTMG | PBA | PHC | 1,6HG | — | TMP | PCL |
| Molecular weight | 122 | 134 | 1,000 | 2,000 | 3,000 | 1,000 | 1,000 | 122 | | 134 | 2,000 |
| Number of OH | 2 | 3 | 2 | 3 | 2 | 2 | 2 | 2 | | 3 | 3 |
| Amount (parts) | 1 | 1 | 5 | 10 | 10 | 5 | 5 | 1 | | 1 | 10 |
| Coronate L Amount (parts) | — | — | — | — | — | — | — | — | 15 | — | — |
| Gloss (%) | 100 | 100 | 100 | 110 | 110 | 120 | 130 | 100 | 80 | 100 | 75 |
| Viscosity of a coating (cps) | 1,800 | 1,800 | 1,800 | 1,500 | 1,500 | 1,400 | 1,300 | 2,100 | 3,200 | 1,500 | 10,000 |
| Squareness ratio | 0.87 | 0.87 | 0.87 | 0.87 | 0.87 | 0.91 | 0.93 | 0.87 | 0.78 | 0.83 | 0.70 |
| Durability of a coated film | A | A | A | A | A | A | A | B | D | C | C |
| Running property | A | A | A | A | A | A | A | B | C | C | C |

*1) (a) Vinylchloride-vinyl acetate-maleic acid-vinyl alcohol copolymer (average polymerization degree: 400, COOH: 0.8 wt. %, OH: 1.0 wt. %)
(b) Vinyl chloride copolymer containing an epoxy group and $SO_4K$ (MR-110: a tradename for a product of Nippon Zeon Co., Ltd.)
*2) 1,6HG: 1,6-hexanediol
TMP: trimethylolpropane
PBA: polybutylene adipate
PCL: polycaprolactone polyol
PTMG: polytetramethylene glycol
PHC: polycarbonate polyol

TABLE 5

|  | Example |  |  |  |  |
| --- | --- | --- | --- | --- | --- |
|  | 19 | 20 | 21 | 22 | 23 |
| Resin composition (parts) | | | | | |
| Polyurethane resin | C | D | H | I | E |
| Amount (parts) | 55 | 55 | 55 | 55 | 55 |
| Resin other than the polyurethane resin *1) | (a) | (a) | (a) | (a) | (c) |
| Amount (parts) | 50 | 50 | 50 | 50 | 50 |
| Triazinethiol compound R in formula (1) | —SH | —N(CH$_3$)$_2$ | —NHC$_6$H$_5$ | —N(C$_4$H$_9$)$_2$ | —N(C$_4$H$_9$)$_2$ |
| Coronate L Amount (parts) | — | — | — | — | — |
| Gloss (%) | 105 | 105 | 120 | 125 | 110 |
| Viscosity of a coating (cps) | 2,200 | 2,200 | 1,500 | 1,500 | 1,800 |
| Squareness ratio | 0.87 | 0.87 | 0.90 | 0.91 | 0.88 |
| Durability of a coated film | B | B | B | B | A |
| Running property | A | A | A | A | A |

|  | Example |  | Comparative Example |  |  |  |
| --- | --- | --- | --- | --- | --- | --- |
|  | 24 | 25 | 15 | 16 | 17 | 18 |
| Resin composition (parts) | | | | | | |
| Polyurethane resin | F | G | B | J | K | L |
| Amount (parts) | 55 | 60 | 55 | 40 | 55 | 55 |
| Resin other than the polyurethane resin *1) | (d) | (e) | (a) | (a) | (a) | (a) |
| Amount (parts) | 50 | 50 | 50 | 50 | 50 | 50 |
| Triazinethiol compound R in formula (1) | —N(C$_8$H$_{17}$)$_2$ | —N(C$_{12}$H$_{25}$)$_2$ | —N(C$_4$H$_9$)$_2$ | — | — | —N(C$_4$H$_9$)$_2$ |
| Coronate L Amount (parts) | — | — | — | 15 | — | — |
| Gloss (%) | 110 | 105 | 105 | 80 | 95 | 85 |
| Viscosity of a coating (cps) | 1,800 | 2,200 | 2,200 | 3,200 | 2,200 | 9,800 |
| Squareness ratio | 0.88 | 0.87 | 0.87 | 0.78 | 0.83 | 0.72 |
| Durability of a coated film | A | A | C | D | D | D |
| Running property | A | A | B | C | C | C |

TABLE 5-continued

*1) (a) Vinylchloride-vinyl acetate-maleic acid-vinyl alcohol copolymer (average polymerization degree: 390, COOH: 0.8 wt. %, OH: 1.0 wt. %)
(c) Vinyl chloride-allylglycidyl ether-2-hydroxypropyl methacrylate copolymer (average polymerization degree: 310, epoxy group: 3.5 wt. %, $SO_4$: 0.7 wt. %, OH: 0.7 wt. %, VCl: 84 wt. %)
(d) vinyl chloride-allylglycidyl ether-sodium styrene sulfonate-vinyl acetate copolymer (average polymerization degree: 400, epoxy group: 1.5 wt. %, $SO_3Na$: 1.0 wt. %, VCl: 87 wt. %)
(e) Epoxy-modified polyurethane resin containing 10% of an epoxy group and having a molecular weight of 17,000, said resin being obtained by reacting an epoxy resin of bisphenol A having an epoxy equivalent of 182 to 194 and a molecular weight of 355 to form a polyester resin, adding 4,4'-diphenylmethane diisocyanate to said polyester resin and heating the mixture.

TABLE 6

|  | Example |  |  |  |  |  |  | Comparative Example |  |  |  |
| --- | --- | --- | --- | --- | --- | --- | --- | --- | --- | --- | --- |
|  | 26 | 27 | 28 | 29 | 30 | 31 | 32 | 19 | 20 | 21 | 22 |
| Resin composition (parts) |  |  |  |  |  |  |  |  |  |  |  |
| Polyurethane resin | C | D | E | F | G | H | I | B | J | K | L |
| Amount (parts) | 55 | 55 | 55 | 55 | 55 | 55 | 55 | 55 | 40 | 55 | 55 |
| Resin other than the polyurethane resin *1) | (a) | (a) | (a) | (b) | (b) | (a) | (b) | (a) | (a) | (b) | (a) |
| Amount (parts) | 50 | 50 | 50 | 50 | 50 | 50 | 50 | 50 | 50 | 50 | 50 |
| Polyamine compound *2) *3) | (i) | (ii) | (iii) | (iv) | (v) | (i) | (ii) | (i) | — | (i) | — |
| Coronate L Amount (parts) | — | — | — | — | — | — | — | — | 15 | — | — |
| Gloss (%) | 100 | 100 | 100 | 110 | 110 | 120 | 130 | 100 | 80 | 100 | 75 |
| Viscosity of a coating (cps) | 1,800 | 1,800 | 1,800 | 1,500 | 1,500 | 1,400 | 1,300 | 1,800 | 3,200 | 1,500 | 9,800 |
| Squareness ratio | 0.87 | 0.87 | 0.87 | 0.87 | 0.87 | 0.91 | 0.93 | 0.87 | 0.78 | 0.83 | 0.72 |
| Durability of a coated film | A | A | A | A | A | A | A | B | D | C | D |
| Running property | A | A | A | A | A | A | A | B | C | C | C |

*1) (a) Vinyl chloride-vinyl acetate-maleic acid-vinyl alcohol copolymer (average polymerization degree: 400, COOH: 0.8 wt. %, OH: 1.0 wt. %)
(b) Vinyl chloride copolymer containing an epoxy group and $SO_4K$ (MR-110: a tradename for a product of Nippon Zeon Co., Ltd.)
*2) (i) tetramethylenediamine
(ii) hexamethylenediamine
(iii) p-phenylenediamine
(iv) diethylenetriamine
(v) triethylenetetramine
*3) The polyamine compound was added such that the amount of the amino group was 0.3 equivalent based on the amount of the isocyanate group of the polyurethane resin.

EXAMPLE 33

A mixture comprising 400 parts of a cobalt-coated magnetic iron oxide powder (specific surface area 40 m²/g), 50 parts of a vinyl chloride polymer (MR-110: a tradename for a product of Nippon Zeon Co., Ltd.) 49 parts of methyl ethyl ketone, 49 parts of toluene, 32 parts of cyclohexanone, 2 parts of carbon black, 4 parts of alumina, 2 parts of myristic acid and 1 part of butyl stearate was sheared and dispersed at high speed for 90 minutes. Subsequently, 40 parts of a polyurethane resin (polybutyrene adipate/1,4-butanediol/ MDI), 30 parts of methyl ethyl ketone, 30 parts of toluene and 20 parts of cyclohexanone were added and dispered for 30 minutes. Further, 50 parts of the above solvent mixture and 15 parts of polyisocyanate (Coronate L: a tradename for a product of Nippon Polyurethane Industry Co., Ltd.) were added, and the mixture was dispersed for another 10 minutes to obtain a magnetic coating. The resulting magnetic coating was coated on a polyester film to a thickness of a coated film of 5 micrometers. The coated film was subjected to magnetic field stretching treatment, then dried and subjected to calender treatment.

Then, a mixture comprising 100 parts of carbon black, 50 parts of a vinyl chloride resin (VINILITE VAGH: a tradename for a product of Union Carbide Corporation), 49 parts of methyl ethyl ketone, 49 parts of toluene and 32 parts of cyclohexanone was sheared and dispersed at high speed for 90 minutes. Subsequently, 55 parts of the polyurethane resin C shown in Table 1, 30 parts of methyl ethyl ketone, 30 parts of toluene and 20 parts of cyclohexanone were added and mixed for 30 minutes. The mixture was coated onto a surface opposite to the coated surface of the magnetic coating composition of the aforesaid polyester film, and the coated film was heat-treated at 65° C. for 65 hours. The resulting film was cut to a width of ½ inch to form a sample tape.

EXAMPLES 34 to 38

A sample tape was prepared as in Example 33 except that in the coating composition of the back coat layer, the binders D, E, F, G and H were used instead of the binder C.

EXAMPLE 39

A sample tape was prepared as in Example 33 except that in the coating composition of the back coat layer, 400×110 A (a tradename for a product of Nippon Zeon Co., Ltd.) was used instead of VINILITE VAGH as a vinyl chloride resin and a binder I instead of the binder C.

Comparative Example 23

A sample tape was prepared as in Example 33 except that in the coating composition of the back coat layer, a binder $B_m$ was used instead of the binder C.

Comparative Example 24

A sample tape was prepared as in Example 33 except that in the coating composition of the back coat layer, 40 parts of the binder J was used instead of 55 parts of the binder B and 15 parts of polyisocyanate (Coronate L: a tradename for a product of Nippon Polyurethane Industry Co., Ltd.) was further added.

Comparative Example 25

A sample tape was prepared as in Example 33 except that in the coating composition of the back coat layer, the binder K was used instead of the binder C.

Comparative Example 26

A sample tape was prepared as in Example 33 except that in the coating composition of the back coat layer, the binder L was used instead of the binder C.

Using the resulting sample tapes, a condition of flaw occurrence, running friction coefficient and surface roughness were measured. The results are shown in Table 7.

Methods of measuring the above properties of the resulting sample tapes are as follows.

8. Condition of flaw occurrence:

The sample tape was put in a VHS cassette and travelled on a VHS deck 100 times at a temperature of 20° C. and a relative humidity of 60%. A condition of flaw occurrence was observed with an unaided eye and evaluated by the following four grades.

⊚: very good o: good

Δ: slightly flawed

X: heavily flawed 9. running friction coefficient:

running friction coefficient was measured at a temperature of 20° C. and a relative humidity of 55% by a tape running tester TBT-300 D (a tradename for a machine of Yokohama System Kenkyusho).

10. Surface roughness:

A tape 2.5 mm in length was measured by a roughness measuring device SE-3C (a tradename for a machine of Kosaka Kenkyusho) with cutoff of 0.25, longitudinal magnification of 5000×, transverse magnification of 50×, and needle pressure of 30 mg.

TABLE 7

| | Condition of flaw occurrence | running friction coefficient | Surface roughness (mμ) |
| --- | --- | --- | --- |
| Example 33 | O | 0.20 | 0.027 |
| Example 34 | O | 0.20 | 0.027 |
| Example 35 | O | 0.21 | 0.028 |
| Example 36 | O | 0.22 | 0.028 |
| Example 37 | O | 0.20 | 0.026 |
| Example 38 | ⊚ | 0.18 | 0.025 |
| Example 39 | ⊚ | 0.18 | 0.025 |
| Comparative Example 23 | Δ | 0.25 | 0.033 |
| Comparative Example 24 | X | 0.28 | 0.037 |
| Comparative Example 25 | X | 0.28 | 0.035 |
| Comparative Example 26 | X | 0.29 | 0.037 |

What we claim is:

1. A magnetic recording composition comprising a binder, and a magnetic powder dispersed therein, wherein the binder comprises 10–90% by weight of a polyurethane resin and at least one other polymeric binder, said polyurethane resin being formed by the reaction of diisocyanate, monomeric polyol and polymeric linear diol in amounts of diisocyanate and monomeric polyol to provide an NCO/OH equivalent ratio of 1.2/1 to 2/1, said monomeric polyol being selected from the group consisting of trimethylolpropane, trimethylolethane, glycerol, pentaerythritol and triethanolamine, said polyurethane resin comprising, on average, 2.3 isocyanate groups per molecule, and having a number average molecular weight of at least 2,000 but no more than about 6,000, and said polyurethane containing less than 20% of a molecular weight fraction with a molecular weight of no more than 1,000; and, said at least one other polymeric binder having at least one functional group substituent selected from the group consisting of $-SO_4M$, $-SO_3M$, $-SO_2M$, $-COOM$, $-NH_2$, $-N^+R^1_3$, $-OH$, a phosphoric acid group and a phosphoric acid ester group, wherein $R^1$ represents an alkyl group, an allyl group, an alkenyl group or an alkoxy group, and M represents a hydrogen atom or an alkali metal.

2. A magnetic recording composition according to claim 1 wherein the content of the binder is 10 to 100 parts by weight, per 100 parts by weight of the magnetic powder.

3. A magnetic recording composition according to claim 2 in which the magnetic powder is selected from the group consisting of a ferromagnetic iron oxide powder, a Co-doped ferromagnetic iron oxide powder, a ferromagnetic chromium dioxide powder, a ferromagnetic metallic powder, an iron carbide powder and an iron nitride powder.

4. The magnetic recording composition of claim 3 wherein the ferromagnetic iron oxide powder is selected from gamma-$Fe_2O_3$, $Fe_3O_4$ and gamma-$FeO_x$ ($1.33<x<1.5$).

5. The magnetic recording composition of claim 3 wherein the magnetic powder is selected from the group consisting of barium ferrite, $Fe_5C_2$ and a mixture of barium ferrite and $Fe_5C_2$.

6. The magnetic recording composition of claim 1 which comprises from 15 to 40 parts by weight of the binder per 100 parts by weight of magnetic powder.

7. The magnetic recording composition of claim 1 further comprising triazinethiol in an amount of 0.1 to 20 parts per weight per 100 parts by weight of the magnetic powder.

8. A magnetic recording medium comprising a non-magnetic film substrate and a layer of the magnetic recording composition of any one of claims 1 to 7.

9. The magnetic recording composition of claim 1 wherein the diisocyanate is selected from the group consisting of 4,4'-diphenylmethane diisocyanate, 2,4-tolylene diisocyanate and mixtures thereof.

10. The magnetic recording composition of claim 1 wherein said polymeric linear diol is a linear diol containing a terminal hydroxyl group which is reacted with the diisocyanate.

11. The magnetic recording composition of claim 10 wherein the linear diol containing the terminal hydroxyl group is a diol selected from the group consisting of a polyether diol, a polyester diol and a glycol containing a terminal hydroxyl group and having a molecular weight of 500 to 3,000.

12. The magnetic recording composition of claim 1 comprising at least one polyol selected from the group consisting of a low-molecular aliphatic polyol containing at least 2 hydroxyl groups in a molecule, a polyether polyol, a polyester polyol, a polycaprolactone polyol and a polycarbonate polyol.

13. The magnetic recording composition of claim 1 further comprising a polyol with 0.1 to 1.0 equivalent of a hydroxyl group per equivalent of the isocyanate group in the polyurethane resin.

14. The magnetic recording composition of claim 1 further comprising a triazinethiol represented by formula

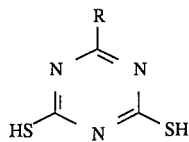

wherein

R is selected from the group consisting of —SH, —N(CH$_2$)$_2$, —NHC$_6$H$_5$, —N(C$_4$H$_9$)$_2$, —N(C$_9$H$_{17}$)$_2$, —N(CH$_2$CH=CH$_2$)$_2$ and —NHC$_8$H$_{16}$CH=CHC$_8$H$_{17}$.

15. The magnetic recording composition of claim 1 further comprising at least one polyamine selected from the group consisting of ethylenediamine, tetramethylenediamine, pentamethylenediamine, hexamethylenediamine, o-phenylenediamine, p-phenylenediamine, 4-aminodiphenylamine, 1,2,3-triaminopropane, tris(2-aminoethyl)methane, tetra(aminomethyl)methane, diethylenetriamine, triaminobenzene, triethylenetetramine and tetraethylenepentamine.

16. The binder of claim 15 comprising said polyamine compound wherein the content of an amino group is 0.1 to 1.0 equivalent per equivalent of the isocyanate group in the polyurethane resin.

17. The magnetic recording composition of claim 1 further comprising an epoxy group-containing resin.

18. The magnetic recording composition of claim 17 wherein he epoxy group-containing resin is selected from the group consisting of an epoxy group-containing vinyl chloride resin, an epoxy group-containing chlorinated polyvinyl chloride resin, an epoxy-modified polyurethane resin, an epoxy-modified polyester resin, an epoxy-modified acrylonitrile-butadiene copolymer resin and an epoxy resin.

19. The magnetic recording composition of claim 1 wherein the monomeric polyol is trimethylol propane and the NCO/OH equivalent ratio of diisocyanate and trimethylolpropane is in the range of from 1.2/1 to 1.6/1.

20. A magnetic recording medium comprising a non-metallic support, a magnetic layer coated on one surface thereof and a back coat layer on the other surface thereof, wherein said back coat layer comprises a non-magnetic powder dispersed in a binder, and said magnetic layer comprises a layer of the magnetic resin composition of claim 1.

21. The magnetic recording medium of claim 20 wherein the non-magnetic powder is a powder of a substance selected from the group consisting of carbon black, hematite, mica, silica gel, magnesium oxide, zinc sulfide, tungsten carbide, boron nitride, starch, zinc oxide, kaolin, talc, clay, lead sulfate, barium carbonate, calcium carbonate, magnesium carbonate, boehmite, alumina, tungsten sulfide, titanium oxide, poly(tetrafluoroethylene), polyethylene, polyvinyl chloride and meals.

* * * * *